Aug. 12, 1958  A. W. TRONNIER  2,846,923
HIGH SPEED OBJECTIVE LENS WITH ANASTIGMATICALLY FLATTENED FIELD
Filed Feb. 25, 1957
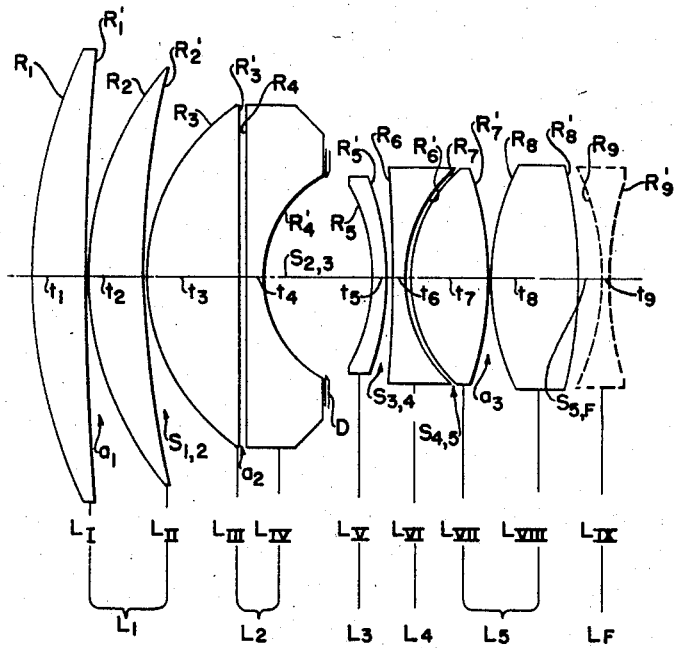
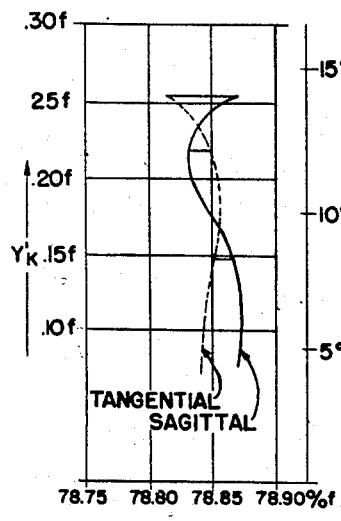
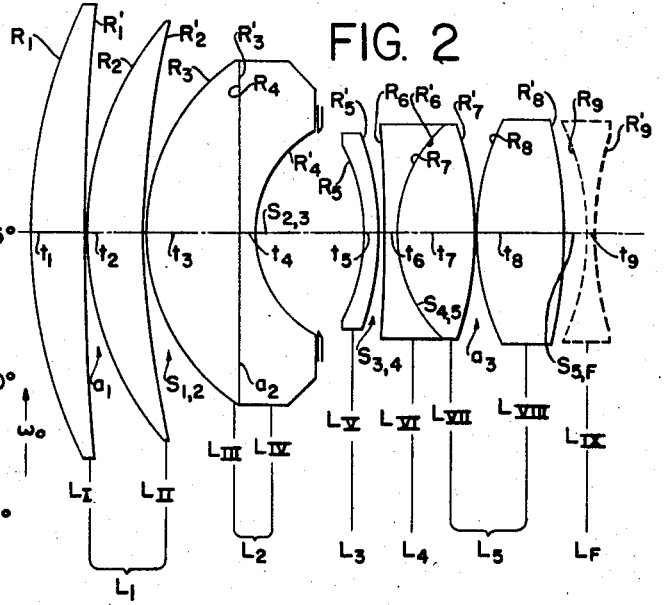
INVENTOR
ALBRECHT WILHELM TRONNIER United States Patent Office  2,846,923
Patented Aug. 12, 1958

2,846,923

HIGH SPEED OBJECTIVE LENS WITH ANASTIGMATICALLY FLATTENED FIELD

Albrecht Wilhelm Tronnier, New York, N. Y., assignor to Farrand Optical Co., Inc., New York, N. Y., a corporation of New York Application February 25, 1957, Serial No. 642,096

9 Claims. (Cl. 88—57)

The present invention relates to very fast objectives with anastigmatically flattened fields and provides such objectives having a relative aperture equal to or greater than $f/1$.

Objectives of such speed have been proposed in various forms for the purposes of photography under unfavorable light conditions and for the imaging of objects onto the light sensitive surfaces of television pick-up tubes. In these proposals of the prior art the objective has been corrected for the imaging of distant objects. Similar constructions have been proposed for photography of X-ray image screens in which however the fine correction of image errors is effected for the short object distances encountered with lenses so operated at finite conjugates. These objectives however all have only small useful field angles, a total field angle of some 15° being typical of the values achieved. These objectives of the prior art are in some cases provided with only a single monochromatic correction, or else they have been achromatized over only a very narrow range of wavelengths, primarily of the green and blue. In these designs zonal errors up to some five thousandths of the equivalent focal length have been accepted.

Many attempts have been made to improve these previous forms of objective. It has however always appeared that a reduction of the zonal errors must be achieved either at the cost of a reduction in the relative aperture or at the cost of a reduction in the useful field, or else that upon increase in relative aperture or of the useful field the zonal errors increased on the axis as well as in the extra-axial field portions so that the lens performance was perceptibly reduced.

The invention in contrast provides a new constructional form for very high speed objectives having a large useful field of some 30° total within which all longitudinal residual aberrations for on-axis as well as off-axis object points are reduced to less than two thousandths of the equivalent focal length. By means of the invention moreover it is made possible to effect chromatic correction over a broad spectral range.

The invention achieves this improvement by means of a new physical arrangement of the individual elements of the lens, in particular of those surrounding the diaphragm position.

The invention will now be described in detail with reference to the accompanying drawings in which:

Figs. 1 and 2 are axial sections through two forms of lens according to the invention; and Fig. 3 is a graph useful in explaining the properties of the lens of the invention, in particular the lens of Example 1.

The lens of the invention comprises five components each including one or more elements, i. e. one or more pieces of transparent refractive material. The components are identified in each of Figs. 1 and 2 as $L_{(1)}$ to $L_{(5)}$ beginning at the long conjugate side of the lens. The lens is in use usually followed by a field lens shown in Figs. 1 and 2 in dashed outline as $L_{(F)}$.

In each of Figs. 1 and 2 the five lens components $L_{(1)}$ to $L_{(5)}$ are shown in section with their individual lens elements $L_I$ to $L_{VIII}$ and with the field lens $L_{(F)}$ indicated as element $L_{IX}$. As with all subscripts used in Figs. 1 and 2, the numbers increase from the long to the short conjugate side. The thicknesses of the lens elements are indicated as $t_1$ to $t_9$, and the spacings of the lens components $L_{(1)}$ to $L_{(5)}$ are identified as $s_{(1,2)}$ to $s_{(5,F)}$, whereas the axial spacings of the lens elements within the components $L_{(1)}$, $L_{(2)}$ and $L_{(5)}$ are indicated as $a_1$, $a_2$ and $a_3$. The radii of curvature of the surfaces presented to the long conjugate side of the system are identified by the letter R with subscripts, whereas those presented to the short conjugate side are identified by the letter R'. The diaphragm is indicated at D.

Figs. 1 and 2 differ in that Fig. 1 shows the component $L_{(2)}$ made up of two air-spaced elements and shows an air spacing of components $L_{(4)}$ and $L_{(5)}$, whereas in the embodiment of Fig. 2 the two elements of $L_{(2)}$ are cemented together. Further, in Fig. 2, the adjacent surfaces of components $L_{(4)}$ and $L_{(5)}$ are cemented together.

Referring to Figs. 1 and 2 the diaphragm space is limited on the long conjugate side of the lens by a concave negative meniscus component $L_{(2)}$ preferably including two elements $L_{III}$ and $L_{IV}$ as shown. On the side of the short conjugate a likewise concave negative meniscus component $L_{(3)}$ is presented to the diaphragm position. This is directly followed by a dispersing component $L_{(4)}$ having unequal surface curvatures and having a high power. Consequently in the objectives of the invention the diaphragm space is surrounded by three overcorrecting divergent lens components.

By this concentration of overcorrecting effect in the immediate neighborhood of the diaphragm the invention makes possible the achievement of a fine correction over a substantially larger field than hitherto. The invention also permits a much greater reduction of the aperture aberrations within this large field than do the lens forms of the prior art in which only one or at most two divergent components were provided in the vicinity of the diaphragm.

Another characteristic feature of the invention comprises the attribution to these divergent components of such a distribution of powers as to permit achievement of the desired overcorrections, without the use of such large negative powers as to reduce the speed of the system or to require for compensation thereof the use in other system components of very high positive powers, which have undesirable effects on the form and distribution of the zonal errors.

The power relations among the various components, elements and surfaces of the lens will be given in terms of a power symbol $\Phi$ for the equivalent total power of the lens and in terms of a power symbol $\phi$. A subscript in parentheses to the power symbol $\phi$ denotes a power sum, i. e. the sum of the powers of the surfaces of the component identified by the subscript, if Arabic, or the sum of the powers of the surfaces of the element identified by the subscript if Roman. Similarly $\phi_{(F)}$ denotes the surface power sum of the field lens. An Arabic subscript, not in parentheses, to the power symbol $\phi$ denotes the power of an individual surface, the subscript being applied to the primed power symbol $\phi'$ in the case of surfaces presented to the short conjugate side of the system and being applied to the unprimed power symbol $\phi$ in the case of surfaces presented to the long conjugate side of the system.

In accordance with the invention the distribution of powers among the three divergent components $L_{(2)}$, $L_{(3)}$ and $L_{(4)}$ is made as follows:

(1) The sum $\phi_{(2)}$ of the surface powers of the two exterior surfaces $R_3$ and $R'_4$ of the negative meniscus component $L_{(2)}$ disposed on the long conjugate side of the diaphragm space with its concave surface thereto lies in absolute value between 80% and 160% of the equivalent total power of the objective.

(2) The sum $\phi_{(3)}$ of surface powers of the negative meniscus component $L_{(3)}$ following the diaphragm position, likewise having its concave side to the diaphragm, lies in absolute value between 30% and 80% of the equivalent total power of the objective.

(3) These two negative meniscus components $L_{(2)}$ and $L_{(3)}$ are so proportioned that the sum $\phi_{(2,3)}$ of the surface powers of the two concave surfaces $R'_4$ and $R_5$ thereof adjacent the diaphragm space possesses an absolute value between 250% and 450% of the equivalent total power of the objective.

(4) The sum $\phi_{(4)}$ of the surface powers of the divergent component $L_{(4)}$ of unequal surface curvatures which follows the negative meniscus component $L_{(3)}$ on the rear side of the diaphragm space possesses an absolute value between 130% and 260% of the equivalent total power of the objective.

This central group of three lens components $L_{(2)}$, $L_{(3)}$ and $L_{(4)}$ is enclosed on both sides by a convergent component, the component $L_{(5)}$ on the short conjugate side having substantially greater power than the component $L_{(1)}$ on the long conjugate side. These exterior lens components are according to the invention so proportioned that:

(1) The sum $\phi_{(1)}$ of the powers of all surfaces of the component $L_{(1)}$ lies between 50% and 130% of the equivalent total power of the objective.

(2) The sum $\phi_{(5)}$ of the powers of all the surfaces of the component $L_{(5)}$ lies between 300% and 600% of the equivalent total power of the objective.

The new objective of the invention thus possesses the following make-up, beginning at the long conjugate end thereof:

(1) A convergent two-element front component $L_{(1)}$ whose surface power sum $\phi_{(1)}$ is related to the equivalent power $\Phi$ of the objective by the relation $$0.50\Phi < \phi_{(1)} < 1.30\Phi$$

(2) A negative meniscus component, $L_{(2)}$, concave toward the diaphragm which follows it, advantageously made up of two individual lenses $L_{III}$ and $L_{IV}$ for purposes of spherochromatc correction. The surface power sum $\phi_{(2)}$ of its two exterior surfaces $R_3$ and $R'_4$, both concave toward the diaphragm, conforms to the relation $$0.80\Phi < -\phi_{(2)} < 1.60\Phi$$

(3) The diaphragm space is limited on the short conjugate side by a divergent meniscus component $L_{(3)}$, concave toward the diaphragm space. The two divergent lens surfaces $R'_4$ and $R_5$ which limit the diaphragm space possess a surface power sum $\phi_{(2,3)}$ conforming to the relation $$2.5\Phi < -\phi_{(2,3)} < 4.5\Phi$$

(4) This negative meniscus component $L_{(3)}$ is so proportioned that the sum $\phi_{(3)}$ of its surface powers conforms to the relation $$0.30\Phi < -\phi_{(3)} < 0.80\Phi$$

(5) Then comes a strongly divergent negative component $L_{(4)}$ of unequal curvatures whose surface power sum $\phi_{(4)}$ conforms to the relation $$1.30\Phi < -\phi_{(4)} < 2.60\Phi$$

(6) Lastly comes a strongly convergent component $L_{(5)}$ so proportioned that the sum $\phi_{(5)}$ of its surface powers conforms to the relation $$3.0\Phi < \phi_{(5)} < 6.0\Phi$$

The component $L_{(5)}$ is customarily followed on the side of the final image by a field lens, indicated in dashed lines at $L_{(F)}$ in Figs. 1 and 2. This can be designed to act as a field flattener according to Piazzi-Smyth, or it may be otherwise designed to produce either a positively or a negatively curved image surface according as there is desired a plane image, for example for photographic purposes, or a curved image surface, as in television tubes. Usually, in view of its location close to the final image surface, such a field lens takes the form of a single lens element of divergent power. It can however according to the intended use of the objective comprise two elements and may be of other than negative power, or it can comprise an element of nonspherical power, prismatic for example. Its physical form is specified less by the objective of the invention than by the particular application intended.

This make-up of the objective of the invention makes possible achievement of an extremely fine imagery out to and beyond average field angles at very high relative aperture values, up to and beyond $f/0.9$. Objectives of this class of speeds have on the image side only a very short depth of focus because of the large angle of the cones or bundles of rays encountered. Hence for practical use of wide field angles the achievement of a particularly good anastigmatic imagery is of particular significance by comparison with systems of normal speed and aperture values.

In the case of the present objectives, which constitute a further improvement of the modified Gaussian type, the pair of adjacent surfaces $R'_6$ and $R_7$ of components $L_{(4)}$ and $L_{(5)}$ is made strongly convergent so that the sum of the powers of these surfaces, which may be written as $\phi_{(4,5)}$ or as $\phi_{(N)}$, lies between 12.5% and 47.5% of the equivalent total power of the objective. Thus:

$$0.125\Phi < \phi_{(N)} < 0.475\Phi$$

Adherence to this criterion of the invention makes possible a very complete reduction in the difference between the sagittal and meridional image surfaces in the lateral portions of the field.

Within a field thus nearly free of astigmatism, particular attention must be paid to reduction of the comatic errors of wide-angle ray bundles if the desired fine imagery is to be achieved with bundles of full angular aperture.

Here the invention provides a startlingly effective and simple way to achieve an imagery largely free of asymmetry errors. As between the two strongly convergent individual elements $L_{VII}$ and $L_{VIII}$ of the convergent component $L_{(5)}$, the element $L_{VII}$ is provided with a stronger positive power than the element $L_{VIII}$ in accordance with the following rule:

$$0.45\phi_{(VII)} < \phi_{(VIII)} < 0.90\phi_{(VII)}$$

wherein $$\phi_{(VII)} + \phi_{(VIII)} = \phi_{(5)}$$

$\phi_{(VII)}$ and $\phi_{(VIII)}$ being respectively the sums of the powers of the surfaces of elements $L_{VII}$ and $L_{VIII}$. This simple device for minimizing the asymmetry errors in extremely wide open lateral ray bundles may according to the invention be rendered further effective by distributing the power in the front component $L_{(1)}$ between the two individual elements $L_I$ and $L_{II}$ thereof so that in this component the element $L_{II}$ adjacent the diaphragm possesses a stronger power than the preceding front element $L_I$ as follows:

$$0.55\phi_{(II)} < \phi_{(I)} < 0.95_{(II)}$$

Here again, $$\phi_{(I)} + \phi_{(II)} = \phi_{(1)}$$

$\phi_{(I)}$ and $\phi_{(II)}$ being respectively the sums of the powers of the surfaces of the elements $L_I$ and $L_{II}$.

The new objectives according to the invention make possible a realization of these improvements without requiring the use of radii which are difficult to produce, for example by reason of sharp curvatures. Neither do the objectives of the invention require the use of crystalline materials for the lens elements. On the contrary the objectives of the invention may be realized with the customary glasses of commerce as the examples presently to be given will show. As regards glasses there is selected for both of the high power convergent elements $L_{VII}$ and $L_{VIII}$ behind the diaphragm a glass of high index such as one of the modern glasses low in silica. This choice is made in order to permit relatively flat surfaces in spite of the high surface powers required. Beyond this there are employed only the usual crown and flint glasses which are used in much slower objectives. There will now be given two examples of lenses according to the invention the relative apertures of both of which are greater than f/0.9 and which are therefore to be regarded as extremely fast anastigmats, since they are provided with a true suppression of the difference between sagittal and meridional image surfaces in the extraaxial portions of the field.

In the tabular data for the examples the glasses are identified with respect to their index of refraction $n$ (for the $d$ line of helium having a wavelength $\lambda$ of 5876 Angstrom units) and with respect to their dispersion in terms of their Abbe number $\nu$.

EXAMPLE 1

This example presents for an assumed focal length $f$ of 100 millimeters, corresponding to an equivalent total power $\Phi$ of 10 diopters, the following basic power distribution:

Table 1

$\phi_{(1)} = +8.9$ dptr.
$\phi_{(2)} = -11.6$ dptr.

Diaphragm space:
$\phi_{(2,3)} = -37.8$ dptr.
$\phi_{(3)} = -5$ dptr.
$\phi_{(4)} = -19$ dptr.
$\phi_{(N)} = \phi_{(4,5)} = +3$ dptr.
$\phi_{(5)} = +45$ dptr.

The relative aperture of the lens of Example 1 is f/0.88 and its useful field is 30°. In terms of the equivalent total power $\Phi$, the distribution of powers for the lens components set forth in Table 1 may be given approximately as follows:

Table 2

$\phi_{(1)} = +0.8\ \Phi$
$\phi_{(2)} = -1.2\Phi$

Diaphragm space:
$\phi_{(2,3)} = -3.8\Phi$
$\phi_{(3)} = -0.5\Phi$
$\phi_{(4)} = -2\Phi$
$\phi_{(4,5)} = \phi_{(N)} = +0.3\Phi$
$\phi_{(5)} = +4.5\Phi$ If now consistently with the properties above set forth concerning the relations between $\phi_{(VII)}$ and $\phi_{(VIII)}$ and between $\phi_{(I)}$ and $\phi_{(II)}$, one additionally sets:

$$\phi_{(VIII)} = 0.6\phi_{(VII)} \text{ and}$$
$$\phi_{(I)} = 0.75\phi_{(II)}$$

the following further distribution of powers appears for the individual elements of the lens of Example 1:

$\phi_{(I)} = +3.6$ dptr.
$\phi_{(II)} = +4.7$ dptr.
$\phi_{(1)} = +8.3$ dptr.
$\phi_{(III)} = +11.8$ dptr.
$\phi_{(IV)} = -23.4$ dptr.
$\phi_{(2)} = -11.6$ dptr.

Diaphragm space:
$\phi_{(2,3)} = -37.8$ dptr.
$\phi_{(V)} = -5.0$ dptr.
$\phi_{(VI)} = -18.8$ dptr.
$\phi_{(N)} = +2.9$ dptr.
$\phi_{(VII)} = +27.9$ dptr.
$\phi_{(VIII)} = +17.0$ dptr.
$\phi_{(5)} = +44.9$ dptr.

For the field lens:
$\phi_{(F)} = -13.5$ dptr.

The basic construction implicit in the data for Example 1 already given contains an approximate third order correction. In order to improve this third order correction the surface power sums set forth in Tables 1, 2 and 3 are preferably achieved by an individual surface power distribution as follows:

Table 4

$\phi_1 = +4.35$ dptr.
$\phi'_1 = -0.75$ dptr.
$\phi_2 = +7.60$ dptr.
$\phi'_2 = -2.90$ dptr.
$\phi_3 = +11.82$ dptr.
$\phi'_3 = 0$ dptr.
$\phi_4 = 0$ dptr.
$\phi'_4 = -23.40$ dptr.
$\phi_5 = -14.43$ dptr.
$\phi'_5 = +9.39$ dptr.
$\phi_6 = -1.64$ dptr.
$\phi'_6 = -17.16$ dptr.
$\phi_7 = +20.05$ dptr.
$\phi'_7 = +7.88$ dptr.
$\phi_8 = +11.54$ dptr.
$\phi'_8 = +5.49$ dptr.

For the field lens:
$\phi_9 = -8.00$ dptr.
$\phi'_9 = -5.47$ dptr.

The lens of Example 1 may be constructed from commercially available glasses as follows:

Table 5

| Element | Glass Type | Index $n$ | Abbe Number $\nu$ |
|---|---|---|---|
| $L_I$ | light barium crown glass | $n_1 = 1.59$ | $\nu_1 = 61$ |
| $L_{II}$ | dense barium crown glass | $n_2 = 1.64$ | $\nu_2 = 55$ |
| $L_{III}$ | dense barium crown glass | $n_3 = 1.64$ | $\nu_3 = 55$ |
| $L_{IV}$ | ordinary dense flint | $n_4 = 1.70$ | $\nu_4 = 30$ |
| $L_V$ | extra dense lead flint | $n_5 = 1.73$ | $\nu_5 = 28$ |
| $L_{VI}$ | medium flint | $n_6 = 1.64$ | $\nu_6 = 35$ |
| $L_{VII}$ | dense lanthanum (rare-earth) glass | $n_7 = 1.74$ | $\nu_7 = 45$ |
| $L_{VIII}$ | dense lanthanum (rare-earth) glass | $n_8 = 1.74$ | $\nu_8 = 45$ |
| $L_{IX}$ | ordinary crown | $n_9 = 1.52$ | $\nu_9 = 57$ |

By selecting glasses of specific index and dispersion values, generally within the values set out in Table 5, one obtains for the lens the data as set out in Table 6 below (in terms of an assumed focal length $f=1.0$), it being noted that the lens thicknesses must be dimensioned with proper regard for the large lens diameters which are required by the high speed of the objective, the diameter of the front element being required to amount to at least 115% of the equivalent focal length of the entire lens.

With power distribution given above in Table 4 and with the indices of the glasses indicated in Table 5, the data for the lens thus becomes as follows:

Table 6

| Element | Surface Radius | Thickness $t$ or spacing $a$ or $s$ | Index $n$ | Abbe Number $\nu$ |
|---|---|---|---|---|
| $L_I$ | $R_1=+1.35f$ | $t_1=0.14f$ | $n_1=1.590$ | $\nu_1=61.2$ |
|  | $R'_1=+7.8f$ | $a_1=0.005f$ |  |  |
| $L_{II}$ | $R_2=+0.84f$ | $t_2=0.14f$ | $n_2=1.639$ | $\nu_2=55.5$ |
|  | $R'_2=+2.2f$ | $s_{(1,2)}=0.008f$ |  |  |
| $L_{III}$ | $R_3=+0.54f$ | $t_3=0.25f$ | $n_3=1.639$ | $\nu_3=55.5$ |
|  | $R'_3=\infty$ | $a_2=0$ |  |  |
| $L_{IV}$ | $R_4=\infty$ | $t_4=0.04f$ | $n_4=1.698$ | $\nu_4=30.1$ |
|  | $R'_4=+0.3f$ | $s_{(2,3)}=0.28f$ |  |  |
| $L_V$ | $R_5=-0.51f$ | $t_5=0.04f$ | $n_5=1.729$ | $\nu_5=28.3$ |
|  | $R'_5=-0.78f$ | $s_{(3,4)}=0.01f$ |  |  |
| $L_{VI}$ | $R_6=-3.8f$ | $t_6=0.04f$ | $n_6=1.637$ | $\nu_6=35.4$ |
|  | $R'_6=+0.37f$ | $s_{(4,5)}=0$ |  |  |
| $L_{VII}$ | $R_7=+0.37f$ | $t_7=0.19f$ | $n_7=1.744$ | $\nu_7=44.7$ |
|  | $R'_7=-0.94f$ | $a_3=0.01f$ |  |  |
| $L_{VIII}$ | $R_8=+0.64f$ | $t_8=0.23f$ | $n_8=1.744$ | $\nu_8=44.7$ |
|  | $R'_8=-1.35f$ | $s_{(5,F)}=0.06f$ |  |  |
| $L_{IX}$ | $R_9=-0.64f$ | $t_9=0.02f$ | $n_9=1.516$ | $\nu_9=56.8$ |
|  | $R'_9=+0.94f$ |  |  |  |

An analysis of the Seidel region aberrations of the lens in accordance with the approximate data given in Table 6 strikingly indicates the improvements in imagery obtained in accordance with the invention and further shows how a further and higher degree of correction is made possible.

The following definitive data for the lens of Example 1 show by a simple comparison of values that with a minimum amount of computational effort on variation in values from the approximate data already given there is achievable the great improvement made possible by the invention.

Table 7

[Lens of Example 1, relative aperture f/0.88, scaled to a focal length of 100 mm.]

| Element | Surface Radius in mm. | Thickness $t$ or spacing $a$ or $s$, in mm. | Index $n$ | Abbe Number $\nu$ |
|---|---|---|---|---|
| $L_I$ | $R_1=+135.49$ | $t_1=14.2095$ | $n_1=1.58987$ | $\nu_1=61.2$ |
|  | $R'_1=+781.92$ | $a_1=0.5282$ |  |  |
| $L_{II}$ | $R_2=+84.121$ | $t_2=14.2095$ | $n_2=1.63909$ | $\nu_2=55.5$ |
|  | $R'_2=+220.41$ | $s_{(1,2)}=0.7924$ |  |  |
| $L_{III}$ | $R_3=+54.052$ | $t_3=24.6289$ | $n_3=1.63909$ | $\nu_3=55.5$ |
|  | $R'_3=\infty$ | $a_2=0$ |  |  |
| $L_{IV}$ | $R_4=\infty$ | $t_4=4.5296$ | $n_4=1.69842$ | $\nu_4=30.1$ |
|  | $R'_4=+29.845$ | $s_{(2,3)}=28.4322$ |  |  |
| $L_V$ | $R_5=-50.486$ | $t_5=3.8825$ | $n_5=1.72850$ | $\nu_5=28.3$ |
|  | $R'_5=-77.571$ | $s_{(3,4)}=1.2942$ |  |  |
| $L_{VI}$ | $R_6=-387.33$ | $t_6=3.8825$ | $n_6=1.63694$ | $\nu_6=35.4$ |
|  | $R'_6=+37.108$ | $s_{(4,5)}=0$ |  |  |
| $L_{VII}$ | $R_7=+37.108$ | $t_7=19.3780$ | $n_7=1.74400$ | $\nu_7=44.7$ |
|  | $R'_7=-94.395$ | $a_3=1.2942$ |  |  |
| $L_{VIII}$ | $R_8=+64.497$ | $t_8=22.9782$ | $n_8=1.74400$ | $\nu_8=44.7$ |
|  | $R'_8=-135.49$ |  |  |  |

With a spacing $s_{(5,F)}=5.9425$ for the field lens $L_{(F)}$, the lens should be as follows:

| | | | | |
|---|---|---|---|---|
| $L_{IX}$ | $R_9=-64.497$ | $t_9=1.9809$ | $n_9=1.51630$ | $\nu_9=56.8$ |
|  | $R'_9=+94.395$ |  |  |  |

To these fully worked out geometrical data for the lens of Fig. 1 there correspond the following surface power values, correct to one part in one hundred thousand:

Table 8

$\phi_1=+4.35354$ dptr.
$\phi'_1=-0.75439$ dptr.
$\quad\phi_{(I)}=+3.59915$ dptr.
$\phi_2=+7.59725$ dptr.
$\phi'_2=-2.88961$ dptr.
$\quad\phi_{(II)}=+4.69764$ dptr.
$\quad\quad\phi_{(1)}=+8.29679$ dptr.
$\phi_3=+11.82371$ dptr.
$\phi'_3=0$
$\quad\phi_{(III)}=+11.82371$ dptr.
$\phi_4=0$
$\phi'_4=-23.40139$ dptr.
$\quad\phi_{(IV)}=-23.40139$ dptr.
$\quad\quad\phi_{(2)}=-11.57768$ dptr.
Diaphragm space:
$\quad\phi'_4+\phi_5=\phi_{(2,3)}=-37.83114$ dptr.
$\phi_5=-14.42975$ dptr.
$\phi'_5=+9.39137$ dptr.
$\quad\phi_{(V)}=\phi_{(3)}=-5.03838$ dptr.
$\phi_6=-1.64445$ dptr.
$\phi'_6=-17.16428$ dptr.
$\quad\phi_{(VI)}=\phi_{(4)}=-18.80873$.
$\quad\phi'_6+\phi_7=\phi_{(4,5)}=\phi_{(N)}=$
$\quad\quad\quad\quad\quad\quad\quad\quad\quad\quad+2.88506$ dptr.
$\phi_7=+20.04934$ dptr.
$\phi'_7=+7.88174$ dptr.
$\quad\phi_{(VII)}=+27.93108$ dptr.
$\phi_8=+11.53535$ dptr.
$\phi'_8=+5.49110$ dptr.
$\quad\phi_{(VIII)}=+17.02645$ dptr.
$\quad\quad\phi_{(5)}=+44.95753$ dptr.
The field lens possesses the powers:
$\phi_9=-8.00498$ dptr.
$\phi'_9=-5.46954$ dptr.
$\quad\phi_{(IX)}=\phi_{(F)}=-13.47452$ dptr.

The equivalent power of the objective amounts to exactly 10 diopters.

The power $\phi$ of each individual surface is as usual given by the formula $$\phi=\frac{1000(n'-n)}{R}$$

wherein $n$ and $n'$ are the indices of the media on the entering and emergent sides of the surface and $R$ is the radius of curvature thereof in millimeters. The surface power sum $\phi_{(VIII)}$ of the last convergent element $L_{VIII}$ on the image side of the system amounts to $+17.02645$ diopters and hence to $$\frac{17.02645}{27.93108}=0.60959$$

or 60.959% of the surface power sum $\phi_{(VII)}$ of the preceding convergent element $L_{VII}$.

The surface power sum $\phi_{(I)}$ of the front element $L_I$ on the object side amounts to $+3.59915$ dptr. and hence to $$\frac{3.59915}{4.69764}=0.76616$$

or 76.616% of the surface power sum $\phi_{(II)}$ of the following convergent element $L_{II}$.

Consequently, on both sides of the diaphragm, and within the general distribution of power among the five components $L_{(1)}$ to $L_{(5)}$, the stronger element of each of the components $L_{(1)}$ to $L_{(5)}$ is the one nearer to the diaphragm.

Fig. 3 indicates for the lens of Example 1 and for an infinitely distant object the distance of the astigmatic image points from the diaphragm plane in percent of the equivalent focal length $f$, for various principal ray inclination $\omega_0$ on the long conjugate side of the lens, given in the scale of ordinates at the right. The left-hand scale of ordinates $Y'_k$ gives the intersection heights in the image plane of the principal rays, in fractional parts of the equivalent focal length $f$. Fig. 3 thus indicates the improvement achieved by the invention.

EXAMPLE 2

This objective possesses an even higher relative aperture than does the lens of Example 1, its numerical aperture of 0.577 corresponding to a relative aperture of $f/0.866$. The useful field of this lens has a diameter somewhat more than 50% of the equivalent focal length. By application of the constructional principle of the invention the lens of Example 2 is provided with an unusually fine imagery over the whole useful field, an imagery better even than that of Example 1 in spite of the application in Example 2 of several constructional simplifications, namely the use of the same radii and glasses for a number of elements, which simplifies the manufacture and mounting of the lens.

Table 9

[Relative aperture $f/0.866$. Equivalent focal length $f=100$ mm.]

| Element | Surface Radius in mm. | Thickness $t$ or spacing $s$ or $a$ in mm. | Index $n$ | Abbe Number $\nu$ |
|---|---|---|---|---|
| $L_I$ | $R_1=+136.247$ | $t_1=14.28865$ | $n_1=1.58896$ | $\nu_1=61.5$ |
|  | $R'_1=+786.274$ | $a_1=0.53118$ |  |  |
| $L_{II}$ | $R_2=+84.5899$ | $t_2=14.67641$ | $n_2=1.63934$ | $\nu_2=55.5$ |
|  | $R'_2=+221.634$ | $s_{(1,2)}=0.39838$ |  |  |
| $L_{III}$ | $R_3=+54.3527$ | $t_3=26.08609$ | $n_3=1.63934$ | $\nu_3=55.5$ |
|  | $R'_3=\infty$ | $a_2=0$ |  |  |
| $L_{IV}$ | $R_4=\infty$ | $t_4=3.18706$ | $n_4=1.69927$ | $\nu_4=30.1$ |
|  | $R'_4=+30.0115$ | $s_{(2,3)}=28.59059$ |  |  |
| $L_V$ | $R_5=-50.7672$ | $t_5=3.90415$ | $n_5=1.72800$ | $\nu_5=28.3$ |
|  | $R'_5=-78.0033$ | $s_{(3,4)}=1.30138$ |  |  |
| $L_{VI}$ | $R_6=-408.209$ | $t_6=3.88821$ | $n_6=1.63598$ | $\nu_6=35.6$ |
|  | $R'_6=+38.3377$ | $s_{(4,5)}=0$ |  |  |
| $L_{VII}$ | $R_7=+38.3377$ | $t_7=19.48091$ | $n_7=1.74464$ | $\nu_7=44.6$ |
|  | $R'_7=-94.9213$ | $a_3=1.30138$ |  |  |
| $L_{VIII}$ | $R_8=+64.8567$ | $t_8=23.10619$ | $n_8=1.74464$ | $\nu_8=44.6$ |
|  | $R'_8=-144.082$ |  |  |  |

For a spacing $s_{(8,F)}=5.97574$ mm., of the field lens from the last element $L_{VIII}$ of the objective, the field lens $L_{IX}$ should possess the following properties:

| | | | | |
|---|---|---|---|---|
| $L_{IX}$ | $R_9=-74.1921$ | $t_9=1.99191$ | $n_9=1.51637$ | $\nu_9=56.4$ |
|  | $R'_9=+94.9213$ |  |  |  |

In the lens of Example 2 the diaphragm is disposed at a distance $b_1=16.51960$ mm. behind the vertex of the last surface $R'_4$ preceding the diaphragm. With the data given in Table 9, the lens of Example 2 possesses the following power distribution:

Table 10

$\phi_1=+4.32274$ dptr.
$\phi'_1=-0.74905$ dptr.
$\quad\phi_{(I)}=+3.57369$ dptr.
$\phi_2=+7.55811$ dptr.
$\phi'_2=-2.88467$ dptr.
$\quad\phi_{(II)}=+4.67344$ dptr.
$\quad\quad\phi_{(1)}=+8.24713$ dptr.
$\phi_3=+11.76281$ dptr.
$\phi'_3=0$
$\quad\phi_{(III)}=+11.76281$ dptr.
$\phi_4=0$ $\phi'_4=-23.30008$ dptr.
$\quad\phi_{(IV)}=-23.3008$ dptr.
$\quad\quad\phi_{(2)}=-11.53727$ dptr.
Diaphragm space:
$\quad\phi'_4+\phi_5=\phi_{(2,3)}=-37.64004$ dptr.
$\phi_5=-14.33996$ dptr.
$\phi'_5=+9.33294$ dptr.
$\quad\phi_{(V)}=\phi_{(3)}=-5.00702$ dptr.
$\phi_6=-1.55798$ dptr.
$\phi'_6=-16.58890$ dptr.
$\quad\phi_{(VI)}=\phi_{(4)}=-18.14688$ dptr.
$\phi'_6+\phi_7=\phi_{(4,5)}=\phi_{(N)}=+2.83429$ dptr.
$\phi_7=+19.42319$ dptr.
$\phi'_7=+7.84481$ dptr.
$\quad\phi_{(VII)}=+27.26800$ dptr.
$\phi_8=+11.48131$ dptr.
$\phi'_8=+5.16818$ dptr.
$\quad\phi_{(VIII)}=+16.64949$ dptr.
$\quad\quad\phi_{(5)}=+43.91749$ dptr.
For the field lens:
$\phi_9=-6.95990$ dptr.
$\phi'_9=-5.43998$ dptr.
$\quad\phi_{(IX)}=-12.39988$ dptr.$=\phi_{(F)}$ The equivalent power of the objective amounts to exactly 10 diopters.

To indicate the unusually good imagery of the lens of Example 2, there is given in the accompanying Table 11 for the lens of Example 2 the value of the spherical aberration $\delta'_s$, for an infinitely distant object, for a few incident ray heights, the corresponding relative apertures being also given.

Table 11

[Equivalent focal length $f=100$ mm.]

| Relative Aperture | Incident Ray Height in mm. | $\delta'_s$ in mm. |
|---|---|---|
| $\infty$ | 0 | 0 |
| 1.88452 | 26.532 | −0.01605 |
| 1.25631 | 39.799 | −0.00405 |
| 0.86643 | 57.708 | −0.04824 |

The unusually complete suppression of the difference between the sagittal and tangential image surfaces obtainable according to the invention is further demonstrated in the accompanying Table 12, representing the result of exact computation of the astigmatism of the lens of Example 2. In this table there are given the longitudinal departures from a reference plane distant 79.26000 mm. from the diaphragm plane of the sagittal and meridional image points for an infinitely distant object for three principal ray inclinations, these rays being identified by their inclination $\omega$ to the axis at the diaphragm plane and by means of the intersection heights $y'_k$ thereof at the image plane. The departures of the sagittal and the meridional or tangential image points from the reference plane are identified as $\delta_{sag}$ and $\delta_{mer}$ respectively, and are given in millimeters to the fifth decimal place, the last digit given hence representing $1/10,000,000$ of the focal length. The last line of the table gives the residual astigmatism, in mm.

Table 12

| $\omega$ | 20°0'0'' | 30°0'0'' | 35°0'0'' |
|---|---|---|---|
| $y'_k$ | 14.77283 | 21.77936 | 25.14698 |
| $\delta_{sag}$ | −0.03521 | −0.02499 | +0.03683 |
| $\delta_{mer}$ | −0.03653 | +0.00778 | +0.01361 |
| AST | −0.00132 | +0.03277 | −0.02322 |

While the invention has been described herein in terms of a number of preferred embodiments, numerous modifications and variations may be made therein without departing from the scope of the invention itself which is set forth in the appended claims.

I claim:

1. A high speed optical objective lens system of modified Gaussian type comprising, from front to back, and head of the diaphragm position, a first convergent component $L_1$, a first negative meniscus component $L_2$, and, behind the diaphragm position, a second negative meniscus component $L_3$, a negative component $L_4$ of unequal surface curvatures, and a second convergent component $L_5$, the sums $\phi_{(1)}$ to $\phi_{(5)}$ of the powers of the outer surfaces of the said components $L_1$ to $L_5$ respectively being related to the total equivalent power $\Phi$ of the objective as follows:

$$.5\Phi < \phi_{(1)} < 1.3\Phi$$
$$.8\Phi < -\phi_{(2)} < 1.6\phi$$
$$.3\Phi < -\phi_{(3)} < .8\phi$$
$$1.3\Phi < -\phi_{(4)} < 2.6\Phi$$
$$3\Phi < \phi_{(5)} < 6\Phi$$

the sum $\phi_{(2,3)}$ of the powers of the rear surface of component $L_2$ and of the front surface of the component $L_3$ being in addition related to the total equivalent power $\phi$ as follows:

$$2.5\Phi < -\phi_{(2,3)} < 4.5\Phi$$

2. A lens system according to claim 1 in which the sum $\phi_{(N)}$ of the powers of the rear surface of said negative component $L_4$ and of the front surface of said second convergent component $L_5$ is related to the total equivalent power $\Phi$ of the objective system as follows:

$$0.125\Phi < \phi_{(N)} < 0.475\Phi$$

3. A lens system according to claim 1 in which said second convergent component $L_5$ includes a biconvex element $L_{VII}$ followed by a convex element $L_{VIII}$, the sums $\phi_{(VII)}$ and $\phi_{(VIII)}$ of the powers of the surfaces of said elements $L_{VII}$ and $L_{VIII}$ respectively conforming to the following relation:

$$0.45\phi_{(VII)} < \phi_{(VIII)} < 0.9\Phi_{(VII)}$$

4. A lens system according to claim 3 in which said first convergent component $L_1$ includes first and second elements $L_I$ and $L_{II}$, the sums $\phi_{(I)}$ and $\phi_{(II)}$ of the powers of whose surfaces conform to the following relation:

$$0.55\phi_{(II)} < \phi_{(I)} < 0.95\phi_{(II)}$$

5. An objective lens system according to claim 1 in which the sums $\phi_{(1)}$ to $\phi_{(5)}$ of the powers of the outer surfaces of its components $L_1$ to $L_5$ respectively are related to the equivalent total power $\Phi$ of the objective system substantially as follows:

$$\phi_{(1)} = +0.8\Phi$$
$$\phi_{(2)} = -1.2\Phi$$
$$\phi_{(3)} = -0.5\Phi$$
$$\phi_{(4)} = -2\Phi$$
$$\phi_{(5)} = +4.5\Phi$$

and in which the sum $\phi_{(2,3)}$ of the powers of the rear surface of component $L_2$ and of the front surface of component $L_3$ and the sum $\phi_{(N)}$ of the powers of the rear surface of the negative component $L_4$ and of the front surface of the second convergent component $L_5$ are related to the equivalent total power $\Phi$ of the objective system substantially as follows:

$$\phi_{(2,3)} = -3.8\Phi$$
$$\phi_{(N)} = +0.3\Phi$$

6. An objective lens system according to claim 4 in which the first negative meniscus component $L_2$ includes front and rear elements $L_{III}$ and $L_{IV}$, in which the second negative meniscus component $L_3$ and the negative component $L_4$ include respectively elements $L_V$ and $L_{VI}$ and in which the distribution of the sums $\phi_{(I)}$ to $\phi_{(VIII)}$ of the powers of the surfaces of the elements $L_I$ to $L_{VIII}$ thereof respectively is substantially as follows:

$$\phi_{(I)} = +3.6 \text{ dptr.}$$
$$\phi_{(II)} = +4.7 \text{ dptr.}$$
$$\phi_{(III)} = +11.8 \text{ dptr.}$$
$$\phi_{(IV)} = -23.4 \text{ dptr.}$$
$$\phi_{(V)} = -5.0 \text{ dptr.}$$
$$\phi_{(VI)} = -18.8 \text{ dptr.}$$
$$\phi_{(VII)} = +27.9 \text{ dptr.}$$
$$\phi_{(VIII)} = +17.0 \text{ dptr.}$$

in which the sum $\phi_{(2,3)}$ of the powers of the rear surface of element $L_2$ and of the front surface of element $L_3$ is substantially $-37.8$ diopters and in which the sum $\phi_{(N)}$ of the powers of the rear surface of element $L_{VI}$ and of the front surface of element $L_{VII}$ is substantially $+2.9$ diopters.

7. A high speed optical objective system of modified Gaussian type comprising, from front to back, two elements $L_I$ and $L_{II}$ forming a first convergent component, two elements $L_{III}$ and $L_{IV}$ forming a first negative meniscus component, a second negative meniscus element $L_V$, a negative element $L_{VI}$ of unequal surface curvatures, and two elements $L_{VII}$ and $L_{VIII}$ forming a second convergent component, said elements conforming substantially to the following conditions:

| Element | Surface Radius in Multiples of the Equivalent Focal Length | Thickness $t$, Gap $a$, or Spacing $s$ in Multiples of the equivalent focal length | Index $n$ | Abbe No. $\nu$ |
|---|---|---|---|---|
| $L_I$ | $R_1=+1.35f$ | $t_1=0.14f$ | $n_1=1.590$ | $\nu_1=61.2$ |
|  | $R'_1=+7.8f$ | $a_1=0.005f$ |  |  |
| $L_{II}$ | $R_2=+0.84f$ | $t_2=0.14f$ | $n_2=1.639$ | $\nu_2=55.5$ |
|  | $R'_2=+2.2f$ | $s_{(1,2)}=0.008f$ |  |  |
| $L_{III}$ | $R_3=+0.54f$ | $t_3=0.25f$ | $n_3=1.639$ | $\nu_3=55.5$ |
|  | $R'_3=\infty$ | $a_2=0$ |  |  |
| $L_{IV}$ | $R_4=\infty$ | $t_4=0.04f$ | $n_4=1.698$ | $\nu_4=30.1$ |
|  | $R'_4=+0.3f$ | $s_{(2,3)}=0.28f$ |  |  |
| $L_V$ | $R_5=-0.51f$ | $t_5=0.04f$ | $n_5=1.729$ | $\nu_5=28.3$ |
|  | $R'_5=-0.78f$ | $s_{(3,4)}=0.01f$ |  |  |
| $L_{VI}$ | $R_6=-3.8f$ | $t_6=0.04f$ | $n_6=1.637$ | $\nu_6=35.4$ |
|  | $R'_6=+0.37f$ | $s_{(4,5)}=0$ |  |  |
| $L_{VII}$ | $R_7=+0.37f$ | $t_7=0.19f$ | $n_7=1.744$ | $\nu_7=44.7$ |
|  | $R'_7=-0.94f$ | $a_3=0.01f$ |  |  |
| $L_{VIII}$ | $R_8=+0.64f$ | $t_8=0.23f$ | $n_8=1.744$ | $\nu_8=44.7$ |
|  | $R'_8=-1.35f$ | $s_{(5,F)}=0.06f$ |  |  |
| $L_{IX}$ | $R_9=-0.64f$ | $t_9=0.02f$ | $n_9=1.516$ | $\nu_9=56.8$ |
|  | $R'_9=+0.94f$ |  |  |  | wherein $R_1$ to $R_9$ are respectively the radii of the front refracting surfaces of the elements $L_I$ to $L_{IX}$; $R'_1$ to $R'_9$ are respectively the radii of the rear refracting surfaces of the elements of $L_I$ to $L_{IX}$; $t_1$ to $t_9$ are respectively the axial thicknesses of the elements $L_I$ to $L_{IX}$; $a_1$, $a_2$ and $a_3$ are respectively the axial gaps between the pairs of elements $L_I$ and $L_{II}$, $L_{III}$ and $L_{IV}$, $L_{VII}$ and $L_{VIII}$; and $s_{(1,2)}$, $s_{(2,3)}$, $s_{(3,4)}$, $s_{(4,5)}$, $s_{(5,F)}$ are respectively the axial spacings between the pairs of elements $L_{II}$ and $L_{III}$, $L_{IV}$ and $L_V$, $L_V$ and $L_{VI}$, $L_{VI}$ and $L_{VII}$, $L_{VIII}$ and $L_{IX}$.

8. A high speed optical objective system of modified Gaussian type comprising, from front to back, two elements $L_I$ and $L_{II}$ forming a first convergent component, two elements $L_{III}$ and $L_{IV}$ forming a first negative meniscus component, a second negative meniscus element $L_V$, a negative element $L_{VI}$ of unequal surface curvatures, and two elements $L_{VII}$ and $L_{VIII}$ forming a second convergent component, said elements conforming substantially to the following conditions:

| Element | Surface Radius in mm. | Thickness $t$, Gap $a$, or Spacing $s$ in mm. | Index $n$ | Abbe No. $\nu$ |
|---|---|---|---|---|
| $L_I$ | $R_1=+135.49$ | $t_1=14.2095$ | $n_1=1.58987$ | $\nu_1=61.2$ |
|  | $R'_1=+781.92$ | $a_1=0.5282$ |  |  |
| $L_{II}$ | $R_2=+84.121$ | $t_2=14.2095$ | $n_2=1.63909$ | $\nu_2=55.5$ |
|  | $R'_2=+220.41$ | $s_{(1,2)}=0.7924$ |  |  |
| $L_{III}$ | $R_3=+54.052$ | $t_3=24.6289$ | $n_3=1.63909$ | $\nu_3=55.5$ |
|  | $R'_3=\infty$ | $a_2=0$ |  |  |
| $L_{IV}$ | $R_4=\infty$ | $t_4=4.5296$ | $n_4=1.69842$ | $\nu_4=30.1$ |
|  | $R'_4=+29.845$ | $s_{(2,3)}=28.4322$ |  |  |
| $L_V$ | $R_5=-50.486$ | $t_5=3.8825$ | $n_5=1.72850$ | $\nu_5=28.3$ |
|  | $R'_5=-77.571$ | $s_{(3,4)}=1.2942$ |  |  |
| $L_{VI}$ | $R_6=-387.33$ | $t_6=3.8825$ | $n_6=1.63694$ | $s\nu_6=35.4$ |
|  | $R'_6=+37.108$ | $s_{(4,5)}=0$ |  |  |
| $L_{VII}$ | $R_7=+37.108$ | $t_7=19.3730$ | $n_7=1.74400$ | $\nu_7=44.7$ |
|  | $R'_7=-94.395$ | $a_3=1.2942$ |  |  |
| $L_{VIII}$ | $R_8=+64.497$ | $t_8=22.9782$ | $n_8=1.74400$ | $\nu_8=44.7$ |
|  | $R'_8=-135.49$ |  |  |  | wherein $R_1$ to $R_8$ are respectively the radii of the front refracting surfaces of the elements $L_I$ to $L_{VIII}$; $R'_1$ to $R'_8$ are respectively the radii of the rear refracting surfaces of the elements $L_I$ to $L_{VIII}$; $t_1$ to $t_8$ are respectively the axial thicknesses of the elements $L_I$ to $L_{VIII}$; $a_1$, $a_2$ and $a_3$ are respectively the axial gaps between the pairs of elements $L_I$ and $L_{II}$, $L_{III}$ and $L_{IV}$, $L_{VII}$ and $L_{VIII}$; and $s_{(1,2)}$, $s_{(2,3)}$, $s_{(3,4)}$, $s_{(4,5)}$ are respectively the axial spacings between the pairs of elements $L_{II}$ and $L_{III}$, $L_{IV}$ and $L_V$, $L_V$ and $L_{VI}$, $L_{VI}$ and $L_{VII}$.

9. A high speed optical objectives system of modified Gaussian type comprising, from front to back, two elements $L_I$ and $L_{II}$ forming a first convergent component, two elements $L_{III}$ and $L_{IV}$ forming a first negative meniscus component, a second negative meniscus element $L_V$, a negative element $L_{VI}$ of unequal surface curvatures, and two elements $L_{VII}$ and $L_{VIII}$ forming a second convergent component, said elements conforming substantially to the following conditions:

| Element | Surface Radius in mm. | Thickness $t$ or Spacing $s$ or $a$ in mm. | Index $n$ | Abbe Number $\nu$ |
|---|---|---|---|---|
| $L_I$ | $R_1=+136.247$ | $t_1=14.28865$ | $n_1=1.58896$ | $\nu_1=61.5$ |
|  | $R'_1=+786.274$ | $a_1=0.53118$ |  |  |
| $L_{II}$ | $R_2=+84.5899$ | $t'_2=14.67641$ | $n_2=1.63934$ | $\nu_2=55.5$ |
|  | $R'_2=+221.634$ | $s_{(1,2)}=0.39838$ |  |  |
| $L_{III}$ | $R_3=+54.3527$ | $t_3=26.08609$ | $n_3=1.63934$ | $\nu_3=55.5$ |
|  | $R'_3=\infty$ | $a_2=0$ |  |  |
| $L_{IV}$ | $R_4=\infty$ | $t_4=3.18706$ | $n_4=1.69927$ | $\nu_4=30.1$ |
|  | $R'_4=+30.0115$ | $s_{(2,3)}=28.59059$ |  |  |
| $L_V$ | $R_5=-50.7672$ | $t_5=3.90415$ | $n_5=1.72800$ | $\nu_5=28.3$ |
|  | $R'_5=-78.0033$ | $s_{(3,4)}=1.30138$ |  |  |
| $L_{VI}$ | $R_6=-408.209$ | $t_6=3.88821$ | $n_6=1.63598$ | $\nu_6=35.6$ |
|  | $R'_6=+38.3377$ | $s_{(4,5)}=0$ |  |  |
| $L_{VII}$ | $R_7=+38.3377$ | $t_7=19.48091$ | $n_7=1.74464$ | $\nu_7=44.6$ |
|  | $R'_7=-94.9213$ | $a_3=1.30138$ |  |  |
| $L_{VIII}$ | $R_8=+64.8567$ | $t_8=23.10619$ | $n_8=1.74464$ | $\nu_8=44.6$ |
|  | $R'_8=-144.082$ |  |  |  |

References Cited in the file of this patent

UNITED STATES PATENTS

| 1,812,717 | Rudolph | June 30, 1931 |
| 2,012,822 | Lee | Aug. 27, 1935 |
| 2,319,171 | Warmisham et al. | May 11, 1943 |
| 2,586,866 | Schade | Feb. 26, 1952 |
| 2,662,447 | Tronnier | Dec. 15, 1953 |
| 2,677,989 | Tronnier | May 11, 1954 |

FOREIGN PATENTS

| 439,142 | Great Britain | Nov. 29, 1935 |

UNITED STATES PATENT OFFICE
Certificate of Correction

Patent No. 2,846,923                                     August 12, 1958

Albrecht Wilhelm Tronnier

It is hereby certified that error appears in the printed specification of the above numbered patent requiring correction and that the said Letters Patent should read as corrected below.

Column 5, line 45, Table 1, for "$\phi_{(1)} = +8.9$ dptr." read —$\phi_{(1)} = +8.3$ dptr.—; column 6, line 30, Table 4, for "$\Phi'_1 = -0.75$ dptr." read —$\phi'_1 = -0.75$ dptr.—; column 11, line 7, for "head" read —ahead—; line 24, for "$\phi$" read —$\Phi$—; line 41, for "$<0.9\Phi_{(VII)}$" read —$<0.9\phi_{(VII)}$—; column 13, line 21, in the table, opposite "$L_{VI}$ - - -", last column thereof, for "$S\nu_6 = 35.4$" read —$\nu_6 = 35.4$—; line 39, for "objectives" read —objective—.

Signed and sealed this 11th day of November 1958.

[SEAL]

Attest:
KARL H. AXLINE,
*Attesting Officer.*

ROBERT C. WATSON,
*Commissioner of Patents.*